(12) United States Patent
Haskell

(10) Patent No.: US 11,973,879 B2
(45) Date of Patent: Apr. 30, 2024

(54) LOGGING MODIFICATION INDICATIONS FOR ELECTRONIC DEVICE COMPONENTS

(71) Applicant: HEWLETT PACKARD ENTERPRISE DEVELOPMENT LP, Houston, TX (US)

(72) Inventor: Darrell R. Haskell, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 312 days.

(21) Appl. No.: 17/020,193

(22) Filed: Sep. 14, 2020

(65) Prior Publication Data

US 2022/0086007 A1 Mar. 17, 2022

(51) Int. Cl.
*H04L 9/32* (2006.01)
*H04L 9/08* (2006.01)

(52) U.S. Cl.
CPC .......... *H04L 9/3247* (2013.01); *H04L 9/0866* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 7,716,494 B2 | 5/2010 | Liu et al. | |
| 7,752,458 B2 | 7/2010 | Bade et al. | |
| 8,127,146 B2 | 2/2012 | Thom et al. | |
| 8,291,472 B2 * | 10/2012 | Bak | G06F 16/9024 |
| | | | 726/4 |
| 9,542,568 B2 | 1/2017 | Francis et al. | |
| 9,817,975 B2 | 11/2017 | Liu et al. | |
| 9,866,393 B1 * | 1/2018 | Rush | H04L 9/3236 |
| 9,870,474 B2 | 1/2018 | Bobzin et al. | |
| 10,311,224 B1 | 6/2019 | Farhan et al. | |
| 10,708,059 B2 * | 7/2020 | Benson | H04L 9/3231 |
| 2009/0106563 A1 * | 4/2009 | Cherpantier | G06F 21/86 |
| | | | 726/34 |
| 2013/0061055 A1 * | 3/2013 | Schibuk | G06Q 20/40 |
| | | | 713/172 |
| 2018/0373434 A1 * | 12/2018 | Switzer | G06F 3/0617 |
| 2019/0236279 A1 * | 8/2019 | Depew | G06F 9/44505 |

OTHER PUBLICATIONS

Hewlett Packard Enterprise, QuickSpecs—HPE Integrated Lights-Out (iLO), Dec. 2, 2019 (24 pages).
Jessie Frazelle, "Securing the Boot Process," Feb. 2020, pp. 1-4, ACM, Retrieved from the Internet on May 29, 2020 at URL: <dl.acm.org/doi/fullHtml/10.1145/3379512>.
Wikipedia, OpenSSL last edited Jul. 17, 2020 (16 pages).
Wikipedia, Trusted Platform Module last edited Aug. 11, 2020 (18 pages).

* cited by examiner

*Primary Examiner* — Jeffrey C Pwu
*Assistant Examiner* — Mayasa A. Shaawat
(74) *Attorney, Agent, or Firm* — Trop, Pruner & Hu, P.C.

(57) ABSTRACT

In some examples, an electronic device includes a component comprising information, a secure storage, and a controller to generate a digital signature based on the information of the component, and detect a modification of the component based on the digital signature. The controller can also detect a receipt of an invalid credential, and log, to the secure storage, an indication of the modification of the component and an indication of the receipt of the invalid credential.

19 Claims, 4 Drawing Sheets

LOGGING MODIFICATION INDICATIONS FOR ELECTRONIC DEVICE COMPONENTS

BACKGROUND

An electronic device can include various components, including hardware components and machine-readable instructions (e.g., software components and/or firmware components). The components of the electronic device are assembled by a manufacturer into the electronic device, following which the electronic device is shipped to a target consumer or another entity.

BRIEF DESCRIPTION OF THE DRAWINGS

Some implementations of the present disclosure are described with respect to the following figures.

Figure 1:
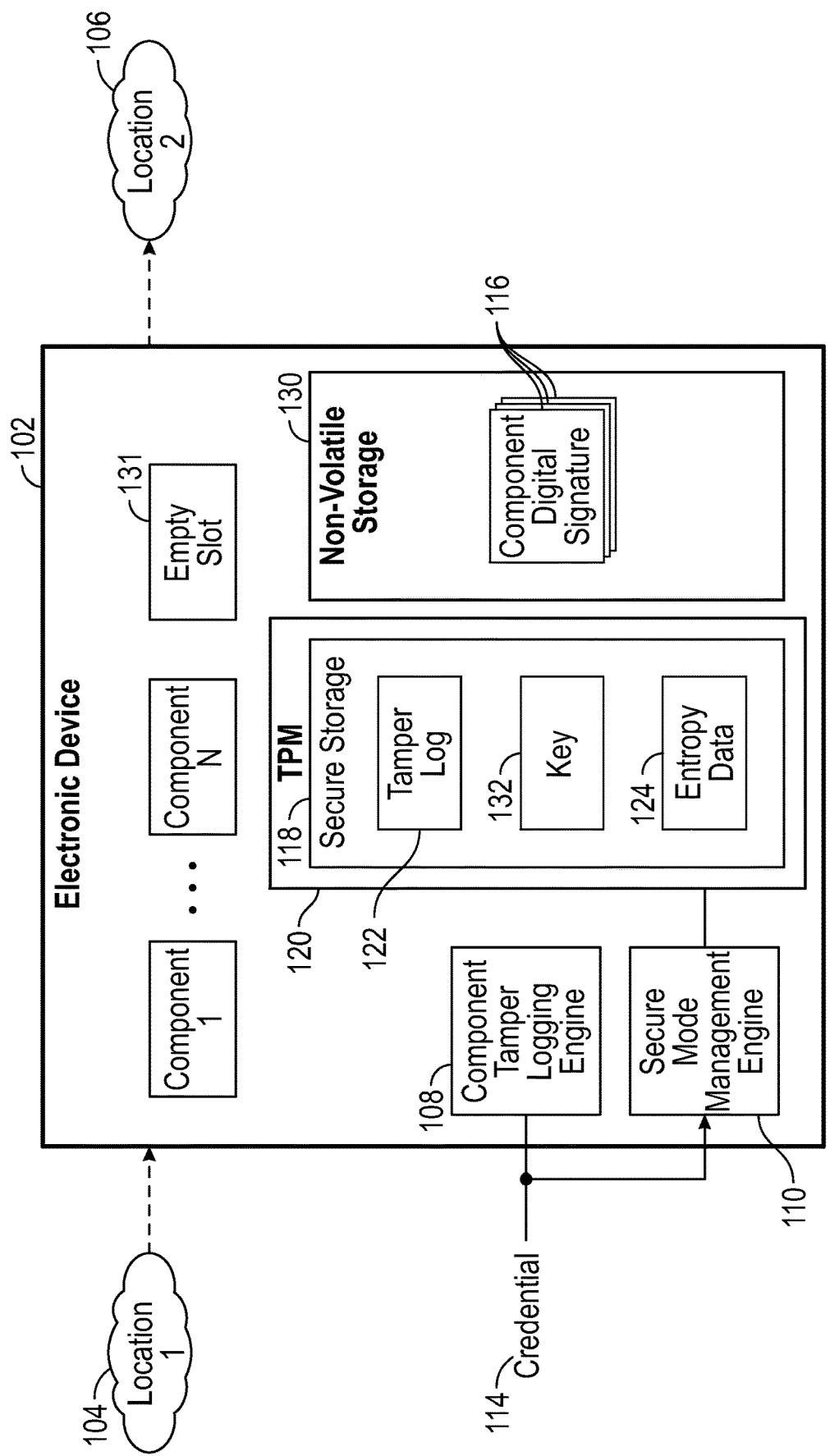
FIG. 1 is a block diagram of an arrangement that includes an electronic device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

During transit of any electronic device between different physical locations (e.g., from a manufacturer to a consumer, from a retail facility to a consumer, from a manufacturer to a distributor or retail facility, etc.), an unauthorized person may attempt to tamper with the electronic device. Examples of tampering can include any or some combination of the following: replacing an existing component with a different component, modifying the component (such as by modifying information stored in the component or modifying program code), adding a new component to the electronic device, or any other type of modification.

Tampering with an electronic device may also occur when the electronic device is physically located at an insecure location, such as in a warehouse, in a retail facility, and so forth.

The tampering of the electronic device can cause the electronic device to either not perform according to its target specifications, or to perform unauthorized activities such as obtaining information and sending the information to a remote entity. The tampering may cause errors in the electronic device, allow a remote entity to control the electronic device or obtain information stored in the electronic device, and so forth.

In some examples, manufacturers (or other entities) can include a security mechanism in an electronic device for detecting tampering with components of the electronic device. The security mechanism can produce digital signatures based on information of the components. The digital signatures can be used for detecting whether tampering with any or some combination of the components has occurred. If tampering is detected, then the security mechanism can take action, such as by sending a notification (e.g., in visual information, in an audio output, in an email notification, in a text message, etc.), preventing completion of a boot of the electronic device, and/or another action.

The security mechanism may be activated when the electronic device is placed into a specific mode of operation, such as a secure mode in which tamper detection is activated for the electronic device in transit or at rest. When the electronic device is in the secure mode, the electronic device is able to detect tampering with components of the electronic device.

In some cases, the security mechanism allows a user to enter a credential (e.g., a password) to authorize a modification of a component in the electronic device. For example, a credential can be entered to transition the electronic device out of the secure mode to a "normal" mode in which component tamper detection is disabled. Once the electronic device is no longer in the secure mode, modifications can be made to the components of the electronic device without triggering a tamper notification.

An unauthorized person may enter credentials in attempts to guess the correct credential so that the unauthorized person can authorize a modification of a component (or components) in the electronic device. When the unauthorized person determines that the unauthorized person is unable to guess the correct credential, the unauthorized person may change the component back to its initial state, such that the modification is no longer present. For example, the unauthorized person may undo a change made to an existing component, remove an added component, replace a new component with the existing component, and so forth.

When a modification of a component occurs followed by undoing the modification, the security mechanism of an electronic device on the next boot would no longer issue a tamper notification, since the component tampering has been undone and the security mechanism would simply detect that the components of the electronic device are in their expected states. As a result, the recipient of the electronic device may not be aware of an attempted tampering.

In accordance with some implementations of the present disclosure, logging of a modification of a component in an electronic device as well as a logging of receptions of invalid credentials are performed. Indications of modifications of components in the electronic device and indications of receptions of invalid credentials can be added to a log in a secure storage. The log in the secure storage is protected against unauthorized access so that an unauthorized entity (e.g., a person, a program, or a machine) would not be able to change the content of the log.

FIG. 1 is a block diagram of an example arrangement in which an electronic device 102 is in transit between a first physical location 104 and a second physical location 106. In some examples, during the transit between the different physical locations 104 and 106, the electronic device 102 may be subject to tampering by an unauthorized person.

In other examples, the electronic device 102 may be subject to tampering while the electronic device is at rest at an insecure location.

Examples of the electronic device 102 can include any or some combination of the following: a desktop computer, a notebook computer, a tablet computer, a smart phone, a server computer, a storage controller, an Internet-of-Things (IoT) device, a communication device (e.g., a router, a switch, etc.), a vehicle, an electronic control unit (ECU) in a vehicle, an appliance, and so forth.

The electronic device 102 includes various protected components 1 through N, where N≥1. A "protected component" refers to a component in the electronic device 102 for which tamper detection is to be performed. There can be just one protected component or multiple protected components in the electronic device 102. Examples of each component can include any or some combination of the following: a hardware component, a software component, a firmware component, a configuration setting, and so forth. Generally, a "component" can refer to any physical item, machine-readable code, or information that may be sensitive to tampering by an authorized entity.

It is noted that the electronic device 102 may include additional components for which tamper detection is not to be performed. Such additional components are not considered protected components.

In examples according to FIG. 1, the electronic device 102 includes various engines according to some implementations of the present disclosure. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The engines of the electronic device 102 include a component tamper logging engine 108 and a secure mode management engine 110. Although two distinct engines are shown in FIG. 1, it is noted that in other examples, the functionalities of the engines 108 and 110 can be consolidated into fewer engines or separated into more engines.

In some examples, the engines 108 and 110 can include firmware code (machine-readable instructions) of the electronic device 102. For example, the firmware code can be part of a Basic Input Output System (BIOS) or Unified Extensible Firmware Interface (EFI) code. In other examples, the engines 108 and 110 can be implemented using other types of executable code. In some examples, the executable code can be executed on a main central processing unit (CPU) of the electronic device 102. The main CPU of the electronic device 102 is a processor that is used to execute an operating system (OS) of the electronic device 102. In other examples, the executable code that is part of the engines 108 and 110 can be executed on other types of processors, such as a baseboard management controller (BMC), or another controller.

A processor can include a microprocessor, a core of a multi-core microprocessor, a microcontroller, a programmable integrated circuit, a programmable gate array, or another hardware processing circuit.

In some examples, a BMC can be used to implement services for the electronic device 102. The BMC can be implemented using a separate processor from the main CPU of the electronic device 102. The main CPU executes an operating system (OS) of the electronic device 102. The BMC can provide so-called "lights-out" functionality for the electronic device 102. The lights out functionality may allow a user, such as a systems administrator, to perform management operations on the electronic device 102 even if an OS is not installed or not functional on the electronic device 102. Moreover, in some examples, the BMC can run on auxiliary power, so that the BMC can continue to operate even if the electronic device 102 is not powered on.

The secure mode management engine 110 can control a transition of the electronic device 102 to or from a secure mode in which tamper detection can be performed with respect to the protected components 1 to N. In some examples, the electronic device 102 may be placed in the secure mode in response to receipt by the secure mode management engine 110 of a credential 114, such as a password, a security token, a certificate, or another type of credential. The electronic device 102 can receive the credential 114 over a communication link, which can be a wired link or a wireless link.

For example, when the electronic device 102 is in the normal mode (a mode in which component tamper detection is not performed), the receipt of the credential 114 can cause the secure mode management engine 110 to transition the electronic device 102 from the normal mode to the secure mode. On the other hand, when the electronic device 102 is in the secure mode, the receipt of the credential 114 can cause the secure mode management engine 110 to transition the electronic device 102 from the secure mode to the normal mode.

In some examples, the credential 114 may be provided by a user as part of ordering the electronic device 102 from a manufacturer or another distributor. For example, as part of ordering the electronic device 102, a user at an online website can enter the credential 114, which is stored by the manufacturer of the electronic device 102 and later provided, over a communication link, to the electronic device 102 once built. Alternatively, the credential 114 may be auto-generated during the manufacturing process of the electronic device 102, and provided to the user. The credential 114 allows the user to request activation of the secure mode of the electronic device 102, so that tamper detection can be initiated to protect the protected component(s) of the electronic device 102 while the electronic device 102 is being shipped to the user and/or while the electronic device 102 is at rest, possibly at an insecure location.

As another example, during use of the electronic device 102 by a user, the user can use a user interface (e.g., a touchscreen, a user input device, etc.) of the electronic device 102 to enter the credential 114. As a further example, a user can enter the credential 114 into a handheld device (e.g., a smartphone), which is then communicated to the electronic device 102.

Once the electronic device 102 is placed in the secure mode, the secure mode management engine 110 is able to generate a digital signature for a protected component, such as on the next boot of the electronic device 102 or in response to another event. A "digital signature for a protected component" can refer to a digital signature generated for an individual protected component or for a combination of the protected components 1 to N in the electronic device 102. In some examples, a digital signature can be computed based on information associated with a single protected component, based on information associated with a subset of the protected components of the electronic device 102, or based on information associated with all of the protected components 1 to N.

In some examples, a digital signature for a protected component is computed by applying a hash function, such as a cryptographic hash function or another hash function, on information associated with the protected component. In such examples, the digital signature is a hash value produced by the hash function. Examples of cryptographic hash functions include a secure hash algorithm (SHA) function, a message digest algorithm (e.g., MD5), and so forth. In other examples, a digital signature can be generated by applying another type of function (e.g., an encoding function, an encryption function, etc.) to the information associated with the protected component.

In an example, a protected component can include a memory device (e.g., a single memory chip or a memory module that includes multiple memory chips). The memory device can store serial presence detect (SPD) information, such as in a non-volatile memory of the memory device. The SPD information can include any or some combination of the following: a serial number of the memory device, a storage size of the memory device, a name of the manufacturer of the memory device, and other information. The digital signature for the memory device can be generated based on the foregoing SPD information (or a portion of the SPD information).

A non-volatile memory refers to a memory that maintains its stored content even if power is removed from the memory. An example of a non-volatile memory is a flash memory. In other examples, another type of non-volatile memory can be employed.

In another example, the protected component can include a CPU, which can store information such as the serial number of the CPU, a processing speed, a name of the manufacturer, and other information associated with the CPU. The information of the CPU can be stored in a non-volatile memory of the CPU. The digital signature for the CPU can be generated based on the information stored in the CPU.

Another protected component can include an input/output (I/O) device, such as a Peripheral Component Interconnect Express (PCIe) device or another type of I/O device. The I/O device can also store information, such as in a non-volatile memory, of the I/O device. The digital signature for the I/O device can be generated based on the information stored in the I/O device.

Another protected component includes a program code, such as firmware, software, and so forth. The digital signature for the program code can be generated based on the entire program code or a portion of the program code.

Yet a further protected component includes a security configuration setting. Examples of security configuration settings can include any or some combination of the following: information associated with a secure boot (which refers to a boot of an electronic device in which code executed during the boot is trusted), information pertaining to a boot mode being used (e.g., secure boot, normal boot, etc.), information relating to whether a housing intrusion detection is enabled or disabled for the electronic device 102 (where housing intrusion detection refers to detecting the opening of a housing of the electronic device), and/or other information relating to security associated with the electronic device 102. Examples of information associated with secure boot can include information indicating whether or not the secure boot is enabled or disabled, encryption keys used during the secure boot, and so forth. The digital signature for the security configuration setting can be generated based on information of the security configuration setting.

In FIG. 1, digital signatures generated by the secure mode management engine 110 are stored as component digital signatures 116 (e.g., hash values) in a non-volatile storage 130 of the electronic device 102. The component digital signatures 116 are protected against unauthorized access by digitally signing the component digital signatures 116 using a signing key (which is an encryption key used to encrypt data, in this case the component digital signatures 116). The signing key may be produced from the credential 114 (or another credential) by using a key derivation algorithm. An example of a key derivation algorithm that can be used can be part of the OpenSSL software library used for securing communications over networks. In other examples, other types of key derivation algorithms may be used.

In some examples, the component digital signatures 116 can be stored as an array of digital signatures, and the array can be digitally signed using the signing key. In other examples, the component digital signatures 116 can be individually digitally signed using the signing key. The component digitally signatures 116 stored in the non-volatile storage 130 are digitally signed using the signing key.

Although multiple component digital signatures 116 are shown in FIG. 1, it is noted that in a different example, a single component digital signature 116 can be computed based on information associated with all the protected components 1 to N of the electronic device 102.

The signing key can be stored as a key 132 in a secure storage 118 of the electronic device 102. A "secure storage" refers to a storage that is protected against unauthorized access. In some examples, the secure storage 118 is accessible by an entity (e.g., a user, a program, a machine, etc.) that submits a valid credential, such as the credential 114. The secure storage 118 can be implemented using a non-volatile memory, such as a flash memory or another type of non-volatile memory. In examples shown in FIG. 1, the secure storage 118 is included in a trusted platform module (TPM). A TPM refers to a secure cryptoprocessor that performs various security operations.

TPM supports a platform hierarchy that is under control of boot code of the BIOS in the electronic device 102. The boot code of the BIOS locks the platform hierarchy prior to allowing other code to execute. The secure storage 118 in the TPM 120 is protected by the platform hierarchy being locked.

In other examples, the secure storage 118 can be part of a different device, such as a BMC or another device. For example, the secure storage 118 may be implemented using a battery-backed secure random access memory (RAM). The battery-backed RAM allows data to be stored in the RAM in a non-volatile fashion since a battery allows the RAM to remain powered even if poser is removed in the electronic device 102.

In some examples, the key derivation algorithm used to generate the signing key 132 can also use input entropy data, such as a salt. A "salt" can refer to a value that is used as an additional input to a function (e.g., a key derivation algorithm) to strengthen the security of an output value (the signing key 132). In some examples, the salt can be in the form of a random number generated by a random number generator (e.g., a pseudo-random number generator or a real random number generator). In examples where a salt is used, the credential 114 and the salt can be provided as inputs to the key derivation algorithm, which produces the signing key based on a combination of the user credential and the salt.

In examples where the salt or other input entropy data is used for key derivation, entropy data 124 (e.g., a salt) can also be stored in the secure storage 118.

Once the component digital signatures 116 have been written to the secure storage 118, and while the electronic device 102 is in the secure mode, the secure mode management engine 110 can check for tampering of the protected components by performing the following process, such as at each boot of the electronic device 102 or in response to a different event.

Figure 2:
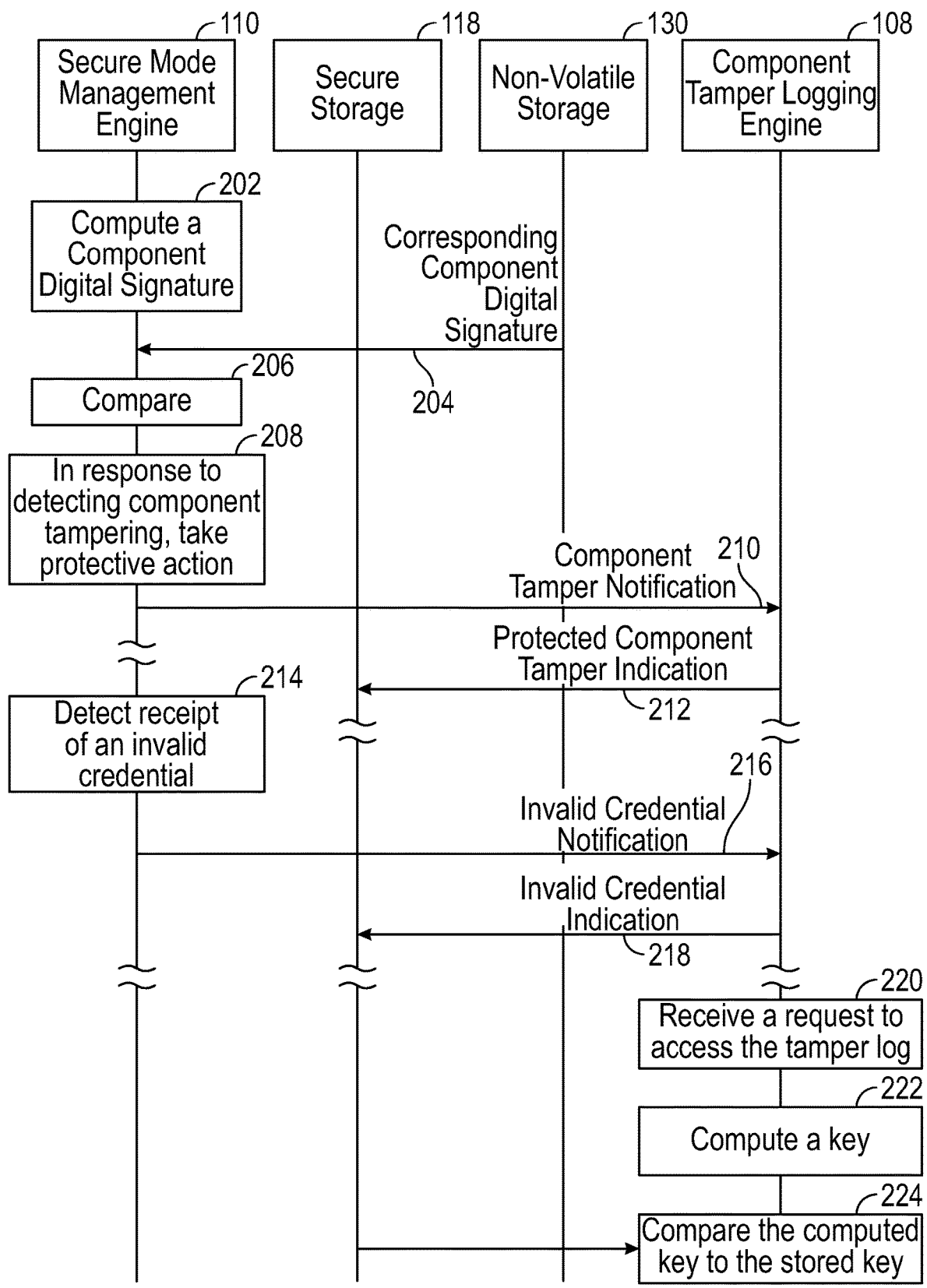
FIG. 2 is a message flow diagram of a process according to some examples.

Referring further to FIG. 2 in combination with FIG. 1, during boot or in response to another event, the secure mode management engine 110 can compute (at 202) a component digital signature for a protected component (an individual protected component or a collection of multiple protected components).

The secure mode management engine 110 retrieves (at 204) a corresponding component digital signature 116 that is stored in the non-volatile storage 130. The secure mode management engine 110 can retrieve the corresponding component digital signature 116 by using the key 132 stored in the secure storage 118, where the key 132 is used to decrypt the digitally signed component digital signatures 116 so that the secure mode management engine 110 is able to obtain the corresponding component digital signature 116. The secure mode management engine 110 compares (at 206) the computed digital signature to the corresponding stored component digital signature 116. If the computed digital signature matches the corresponding stored component digital signature 116, then that is an indication that no tampering has occurred with respect to the component (an individual component or a collection of multiple components). However, if the computed digital signature does not match the corresponding stored component digital signature 116, then that is an indication that tampering has occurred with respect to the component (an individual component or a collection of multiple components).

In response to detecting component tampering, the secure mode management engine 110 can take (at 208) a protective action. The protective action can include issuing a notification of the tampering to a user or other entity. Alternatively or additionally, the secure mode management engine 110 can prevent completion of the boot of the electronic device 102 (such as by sending a tamper indication to the BIOS to cause the BIOS to abort the boot), and/or can perform another protective action.

In accordance with some implementations of the present disclosure, the secure mode management engine 110 can send (at 210) a component tamper notification (e.g., in the form of a signal, a message, a command, an information element, etc.) to the component tamper logging engine 108. In response to receiving the component tamper notification, the component tamper logging engine 108 adds (at 212) a protected component indication to a tamper log 122. The tamper log 122 may also be stored in the secure storage 118 or a different secure storage. In some examples, the tamper log 122 can include a text file or another type of data structure that stores information including indications of tamper detections of components as well as indications of receptions of invalid credentials.

Tasks 202 to 212 can be re-iterated for other protected components in the electronic device 102.

In some examples, tampering can be based on the addition of a new component (e.g., a new hardware device, a new program code, a new security configuration setting, etc.), rather than a change of an existing component in the electronic device 102. For example, the electronic device 102 can include an empty I/O slot 131 (FIG. 1) that is capable of receiving a hardware device, such as a memory device, an I/O device (e.g., a network interface controller), and so forth. The slot 131 may be empty when the secure mode management engine 110 computes component digital signatures 116 that are stored in the non-volatile storage 130. In this case, the secure mode management engine 110 may generate a null signature (that has a specified null value, such as all "0"s or all "1"s) and use the null signature as the component digital signature 116 for the empty slot 131.

Later, an unauthorized person may add a hardware device to the empty slot 131. Subsequently, when the secure mode management engine 110 computes (at 202) a component digital signature for the slot 131 while the electronic device 102 is in the secure mode, the computed digital signature for the slot 131 would no longer have the null signature, and a mismatch will occur in the comparison performed at 206. This will cause the secure mode management engine 110 to send (at 210) a component tamper notification for the slot 131 to the component tamper logging engine 108, which in turn adds the corresponding protected component tamper indication for the slot 131 to the tamper log 122.

Similar techniques can be applied to detecting addition of other types of new components, such as new program code and new security configuration settings.

In further examples, tampering may also be based on removal of an existing component from the electronic device 102. A component digital signature 116 is generated by the secure mode management engine 110 for the existing component, and is stored in the non-volatile storage 130. When the existing component is later removed (by an unauthorized person), such that a previously occupied I/O slot becomes empty, the secure mode management engine 110 would compute a null digital signature for the empty I/O slot when a component digital signature should have been produced for the existing component. Tampering can be detected since the null digital signature would not match the component digital signature should have been produced for the existing component (stored in the non-volatile storage 130).

In some cases, an unauthorized person that tampered with a protected component may submit credentials in attempts at guessing the correct credential (e.g., 114). The secure mode management engine 110 may allow the boot of the electronic device 102 to complete if a valid credential (e.g., 114) is received by the secure mode management engine 110. The receipt of the valid credential allows the secure mode management engine 110 to validate a modification of a protected component. In other words, if a protected component is modified while the electronic device 102 is in the secure mode, then the user can submit the valid credential to allow the secure mode management engine 110 to not indicate the modification of the protected component as a tampering.

Additionally, the secure mode management engine 110 can also allow for a user to request that the electronic device 102 transition from the secure mode to a normal mode (which is a mode of operation of the electronic device 102 in which tamper detection for protected components is not performed) if the request is submitted with a valid credential. Once in the normal mode, after modification of a protected component or multiple protected components, the user of the electronic device 102 can again submit a valid credential to cause the electronic device 102 to transition from the normal mode to the secure mode, at which point the secure mode management engine 110 can re-compute the component digital signatures 116 for the protected components, which at this time includes modified component(s).

The secure mode management engine 110 detects (at 214) receipt of an invalid credential. Detection of receipt of an invalid credential can be based on computing a key based on a received credential (and possibly entropy data), and comparing the computed key to the stored key 132 (in the secure storage 118 or another secure storage). If the computed key does not match the stored key 132, then an invalid credential has been received.

In response to detection of receipt of an invalid credential, the secure mode management engine 110 sends (at 216) an invalid credential notification to the component tamper logging engine 108. In response to the invalid credential notification, the component tamper logging engine 108 adds (at 218) an invalid credential indication to the tamper log 122 in the secure storage 118.

The component tamper logging engine 108 allows a user or another entity (e.g., a program or a machine) to access the tamper log 122 in the secure storage 118. The access of the tamper log 122 can be based on receipt of a valid credential, such as the credential 114.

In response to receiving (at 220) a request to access the tamper log 122 along with a valid credential, the component tamper logging engine 108 can compute (at 222) a key. The computed key is compared (at 224) by the component tamper logging engine 108 to the key 132 stored in the secure storage 118. Access to the tamper log 122 is granted if the computed key matches the stored key. Access to the tamper log 122 is denied if the computed key does not match the stored key.

Figure 3:
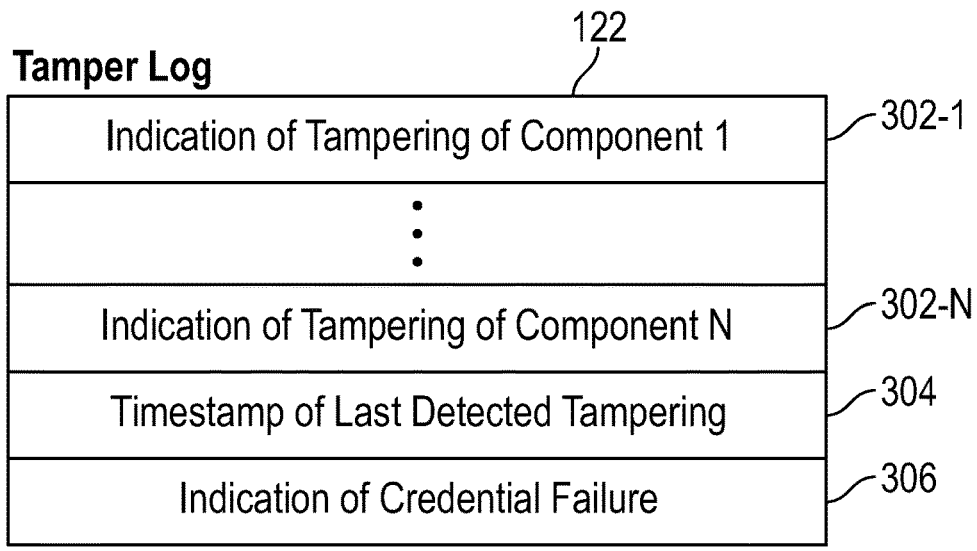
FIG. 3 is a block diagram of entries of a tamper log according to some examples.

FIG. 3 is a block diagram showing example entries of the tamper log 122. The tamper log 122 can include an entry 302-1 that stores a component tamper indication representing a detected tampering of protected component 1, and an entry 302-N that stores a component tamper indication representing a detected tampering of protected component N. Note that an entry 302-i (i=1 to N) can store a component tamper indication representing a detected tampering of a collection of protected components. Each component tamper indication can include an identifier (e.g., serial number(s), name(s), etc.) of the protected component (or collection of protected components) that was tampered with.

A component tamper indication in some examples can include a count of a number of detections of tampering of a respective protected component (or collection of protected components). Thus, if a particular protected component (or particular collection of protected components) has been tampered with multiple times, then the component tamper indication stored in the corresponding entry 302-i includes the count of the number of instances (1 or greater than 1) that tampering has been detected.

The tamper log 122 also includes a timestamp entry 304 that stores a timestamp of the last detected tampering. In other examples, other time values can be stored in the timestamp entry 204. In other examples, timestamps can be stored in the respective entries 302-1 to 302-N to represent the time that the respective protected component (or component collection) was tampered with.

The tamper log 122 also includes a credential failure entry 306 that stores an invalid credential indication. In some examples, the invalid credential indication can include a count of the number of instances (1 or greater than 1) that invalid credentials were received.

Although FIG. 3 shows specific examples of entries of the tamper log 122, it is noted that in other examples, additional entries or alternative entries can be included in the tamper log 122.

The tamper log 122 can be used in any of various different ways. For example, an entity (e.g., a user, a program, or a machine) can retrieve the contents of the tamper log 122 to determine whether attempts were made to tamper with protected components, and to determine whether invalid credentials were received at the electronic device 102. In addition to detecting the indications of tampering with protected components and/or detecting indications of credential failures, the entity can take a protective action, which can include any or some combination of the following: determine where the tampering and/or submission of invalid credential may have occurred, such as based on the timestamp of a detected tampering; prevent the electronic device 102 from operating (such as by preventing a boot of the electronic device 102); send a notification to a target entity (e.g., an administrator, a manufacturer or distributor of the electronic device 102, etc.); or any other action to protect against a future attack or to verify that the electronic device 102 is safe to use. In some examples, the protective action can be initiated by an entity (e.g., machine-readable instructions or a hardware device) inside the electronic device 102. In other examples, the protective action can be initiated by an entity remote from the electronic device 102.

Figure 4:
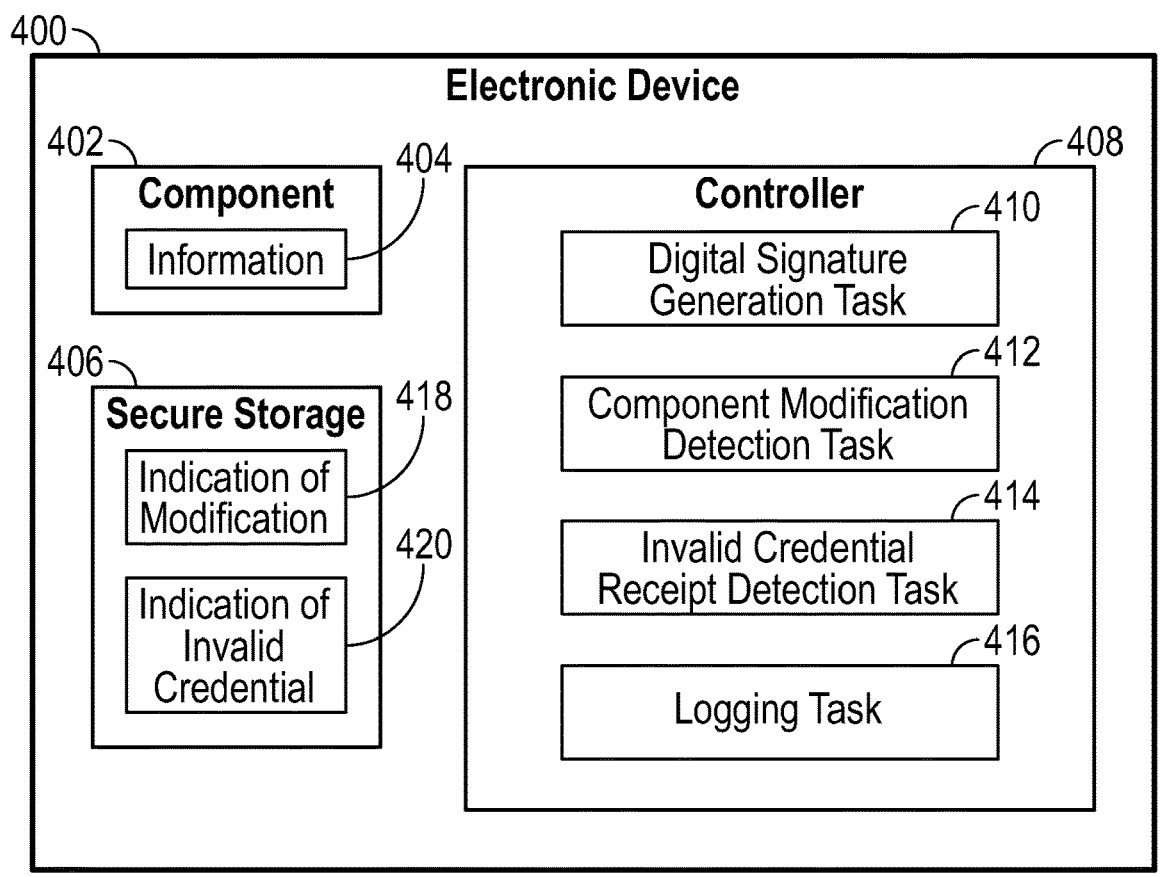
FIG. 4 is a block diagram of an electronic device according to some examples.

FIG. 4 is a block diagram of an electronic device 400 (e.g., the electronic device 102 of FIG. 1). The electronic device 400 includes a component 402 that contains information 404. The component 402 can include a hardware device, a program code, or a security configuration setting, as examples.

The electronic device 400 includes a secure storage 406 and a controller 408. The controller 408 can perform various tasks. In some examples, the controller 408 can include a main CPU and executable code (such as the executable code of the engines 108 and 110 of FIG. 1) executable on the main CPU. In other examples, the controller 408 can include a BMC or another processing circuit.

The tasks of the controller 408 include a digital signature generation task 410 to generate a digital signature based on the information 404 of the component 402. For example, the digital signature can be computed based on applying a function (e.g., a hash function) on the information 404 of the component 402, or alternatively, based on applying the function on a combination of the information 404 of the component 402 and information of another component (or multiple other components).

The tasks of the controller 408 include a component modification detection task 412 to detect a modification of the component 402 based on the digital signature. The detection of the modification of the component 402 includes a detection of a modification of the component 402 individually, or a detection of a modification of a collection of components that includes the component 402. In some examples, the detection of the modification of the component 402 includes a detection of a new component that was not previously present in the electronic device 400. In further examples, the detection of the modification of the component 402 includes a detection of a replacement of a first component with a second component. In additional examples, the detection of the modification of the component 402 includes a detection of a change of the component 402.

The tasks of the controller 408 include an invalid credential receipt detection task 414 to detect a receipt of an invalid credential. For example, the controller 408 can compare a received credential (received over a communication link to the electronic device 400, for example) to a stored credential (e.g., 124 in FIG. 1). If the received credential does not match the stored credential, then the received credential is an invalid credential.

The tasks of the controller 408 include a logging task 416 to log, to the secure storage 406, an indication 418 of the modification of the component and an indication 420 of the receipt of the invalid credential. For example, the logging task can add the indications 418 and 420 to respective entries of a tamper log (e.g., 122 in FIG. 1 or FIG. 3)

In some examples, the controller 408 can validate the modification of the component 402 responsive to receipt of a valid credential.

Figure 5:
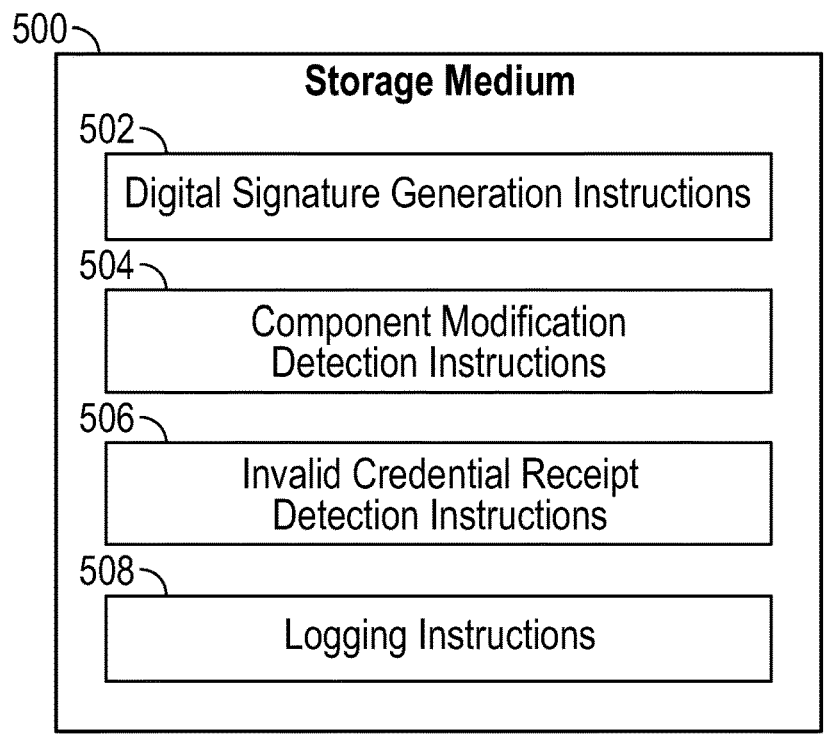
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a controller (e.g., a main CPU, a BMC, etc.) to perform various tasks.

The machine-readable instructions include digital signature generation instructions 502 to generate a digital signature based on information of a component in an electronic device.

The machine-readable instructions include component modification detection instructions 504 to detect a modification of the component based on the digital signature.

The machine-readable instructions include invalid credential receipt detection instructions 506 to detect a receipt of an invalid credential used in an attempt to authorize the modification of the component.

The machine-readable instructions include logging instructions 508 to log, to a secure storage, an indication of the modification of the component and an indication of the receipt of the invalid credential.

Figure 6:
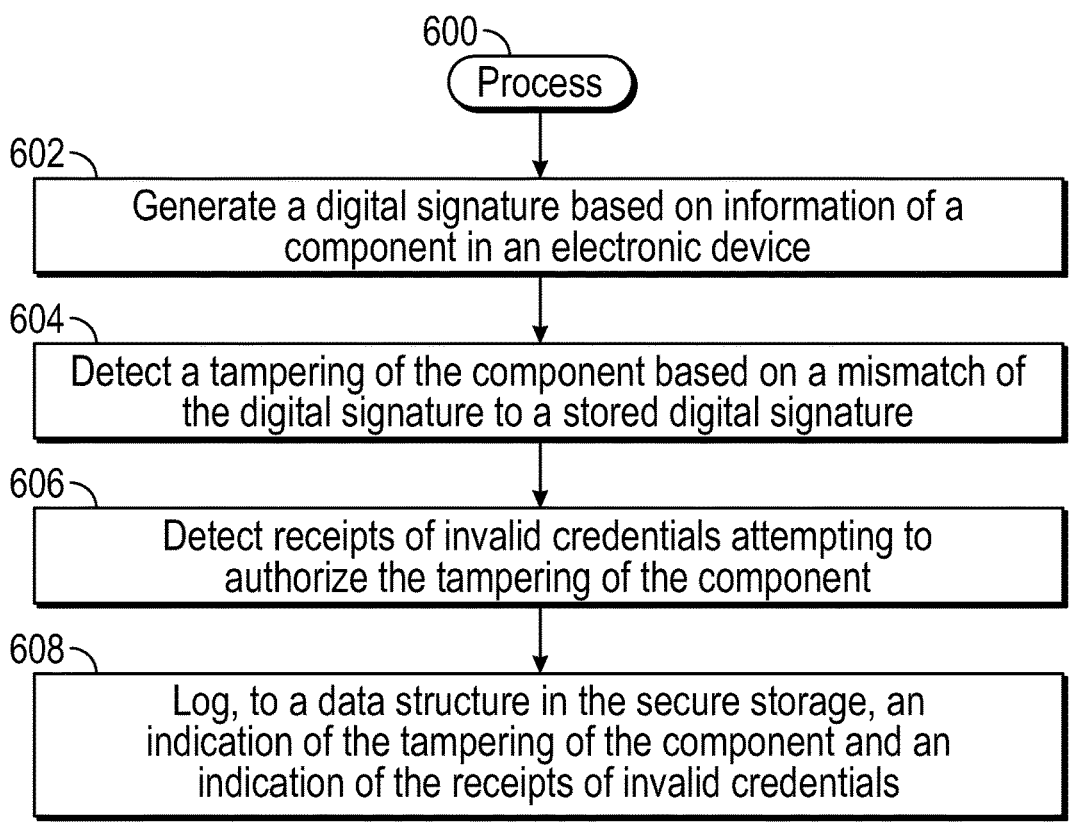
FIG. 6 is a flow diagram of a process of a controller, according to some examples.

FIG. 6 is a flow diagram of a process 600 that can be performed by a controller according to some implementations of the present disclosure.

The process 600 includes generating (at 602) a digital signature based on information of a component in an electronic device.

The process 600 includes detecting (at 604) a tampering of the component based on a mismatch of the digital signature to a stored digital signature.

The process 600 includes detecting (at 606) receipts of invalid credentials attempting to authorize the tampering of the component.

The process 600 includes logging (at 608), to a data structure (e.g., the tamper log 122 of FIG. 1 or 3) in the secure storage, an indication of the tampering of the component and an indication of the receipts of invalid credentials. The indication of the tampering of the component includes a count of a number of occurrences of tampering with the component, and the indication of the receipts of the invalid credentials includes a count of a number of occurrences the receipts of the invalid credentials.

A storage medium (e.g., 500 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
   a component comprising information;
   a secure storage; and
   a controller to:
   generate a digital signature based on the information of the component, and detect a physical modification of the component based on the digital signature,
   detect a receipt of an invalid credential used in an attempt at authorizing the physical modification of the component,
   log, to the secure storage, an indication of the physical modification of the component, and
   after the physical modification of the component has occurred and the invalid credential was received, log, to the secure storage, an indication of the receipt of the invalid credential used in the attempt at authorizing the physical modification of the component, wherein the indication of the receipt of the invalid credential remains logged in the secure storage after the physical modification of the component is undone.

2. The electronic device of claim 1, wherein the detection of the physical modification of the component comprises a detection of an addition of a new component that was not previously present in the electronic device, wherein an undoing of the addition of the new component comprises a removal of the new component, and wherein the indication of the receipt of the invalid credential used in an attempt at authorizing the addition of the new component remains logged in the secure storage after the new component is removed from the electronic device following the addition of the new component.

3. The electronic device of claim 2, wherein the detection of the addition of the new component comprises a detection responsive to the addition of the new component to a slot that was previously empty.

4. The electronic device of claim 1, wherein the detection of the physical modification of the component comprises a detection of a removal of an existing component from the electronic device, wherein an undoing of the removal of the existing component comprises adding the existing component back to the electronic device, and wherein the indication of the receipt of the invalid credential used in an attempt at authorizing the removal of the existing component remains logged in the secure storage after the existing component is added back to the electronic device following the removal of the existing component.

5. The electronic device of claim 1, wherein the detection of the physical modification of the component comprises a detection of a replacement of a first component with a second component in the electronic device, wherein an undoing of the replacement comprises replacing the second component with the first component in the electronic device, and wherein the indication of the receipt of the invalid credential used in an attempt at authorizing the replacement of the first component with the second component remains logged in the secure storage after the second component is replaced with the first component in the electronic device following the replacement of the first component with the second component.

6. The electronic device of claim 1, wherein the detection of the physical modification of the component comprises a detection of a physical change of the component.

7. The electronic device of claim 1, wherein the detection of the physical modification of the component comprises a detection of a physical modification of a collection of components that includes the component.

8. The electronic device of claim 1, wherein the controller is to validate the physical modification of the component responsive to receipt of a valid credential.

9. The electronic device of claim 1, wherein the controller is to further log a timestamp specifying a time of the physical modification of the component or a time of the receipt of the invalid credential.

10. The electronic device of claim 1, wherein the indication of the physical modification of the component comprises a count of multiple occurrences of component modifications, the count being greater than one.

11. The electronic device of claim 1, wherein the indication of the receipt of the invalid credential comprises a count of multiple occurrences of receipt of invalid credentials, the count being greater than one.

12. The electronic device of claim 1, wherein the component comprises a hardware device.

13. A non-transitory machine-readable storage medium comprising instructions that upon execution cause a controller to:
generate a digital signature based on information of a component in an electronic device;
detect a physical modification of the component based on the digital signature;
detect a receipt of an invalid credential used in an attempt to authorize the physical modification of the component;
log, to a secure storage, an indication of the physical modification of the component; and
after the physical modification of the component has occurred and the invalid credential was received, log, to the secure storage, an indication of the receipt of the invalid credential used in the attempt at authorizing the physical modification of the component, wherein the indication of the receipt of the invalid credential remains logged in the secure storage after the physical modification of the component is undone.

14. The non-transitory machine-readable storage medium of claim 13, wherein the detection of the physical modification of the component comprises a detection of an addition of a new component that was not previously present in the electronic device, wherein an undoing of the addition of the new component comprises a removal of the new component, and wherein the indication of the receipt of the invalid credential used in an attempt at authorizing the addition of the new component remains logged in the secure storage after the new component is removed from the electronic device following the addition of the new component.

15. The non-transitory machine-readable storage medium of claim 13, wherein the instructions upon execution cause the controller to:
receive a valid credential;
generate a key based on the valid credential; and
access, based on the key, a data structure comprising the indication of the physical modification of the component and the indication of the receipt of the invalid credential.

16. The non-transitory machine-readable storage medium of claim 13, wherein the detection of the physical modification of the component comprises a detection of a removal of an existing component from the electronic device, wherein an undoing of the removal of the existing component comprises adding the existing component back to the electronic device, and wherein the indication of the receipt of the invalid credential used in an attempt at authorizing the removal of the existing component remains logged in the secure storage after the existing component is added back to the electronic device following the removal of the existing component.

17. A method comprising:
generating, by a controller comprising a hardware processor, a digital signature based on information of a component in an electronic device;
detecting, by the controller, a physical modification of the component based on a mismatch of the digital signature to a stored digital signature;
detecting, by the controller, a receipt of an invalid credential used in an attempt to authorize the physical modification of the component;
logging, to a data structure in a secure storage, an indication of the physical modification of the component; and
after the physical modification of the component has occurred and the invalid credential was received, logging, to the data structure in the secure storage, an indication of the receipt of the invalid credential used in the attempt at authorizing the physical modification of the component, wherein the indication of the receipt of the invalid credential remains logged in the data structure after the physical modification of the component is undone.

18. The method of claim 17, wherein the detection of the physical modification of the component comprises a detection of an addition of a new component that was not previously present in the electronic device, wherein an undoing of the addition of the new component comprises a removal of the new component, and wherein the indication of the receipt of the invalid credential used in an attempt at authorizing the addition of the new component remains logged in the data structure after the new component is removed from the electronic device following the addition of the new component.

19. The method of claim 17, wherein the detection of the physical modification of the component comprises a detection of a removal of an existing component from the electronic device, wherein an undoing of the removal of the existing component comprises adding the existing component back to the electronic device, and wherein the indication of the receipt of the invalid credential used in an attempt at authorizing the removal of the existing component remains logged in the data structure after the existing component previously removed is added back to the electronic device.

* * * * *